Sept. 20, 1938. A. H. OELKERS 2,131,013
LOCOMOTIVE DRIVING WHEEL ROLLER BEARING UNIT
Filed Jan. 28, 1935
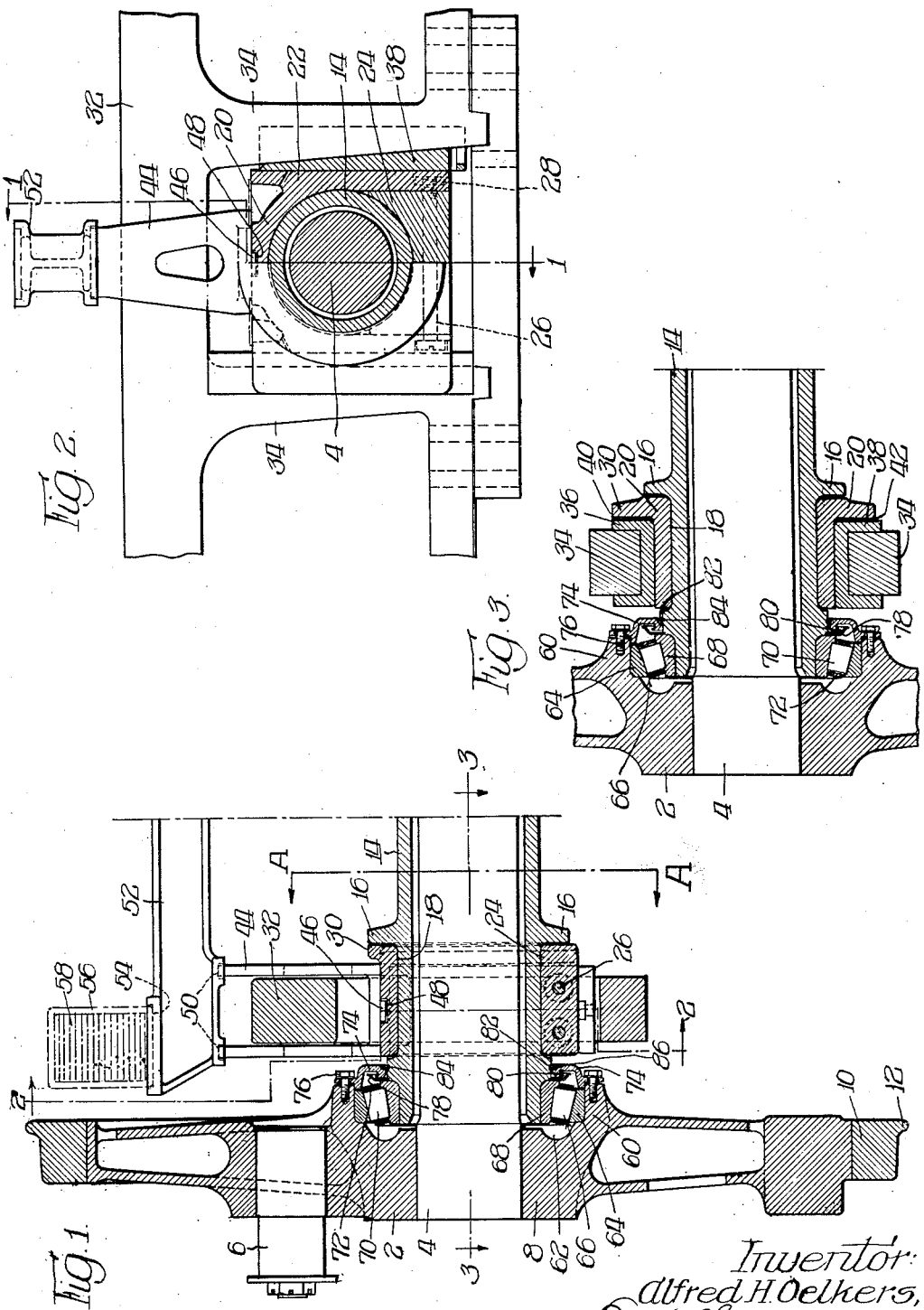
Inventor:
Alfred H. Oelkers,
By Orin O. B. Farner
Atty Patented Sept. 20, 1938

2,131,013

UNITED STATES PATENT OFFICE 2,131,013

LOCOMOTIVE DRIVING WHEEL ROLLER BEARING UNIT

Alfred H. Oelkers, Chicago, Ill., assignor to American Steel Foundries, Chicago, Ill., a corporation of New Jersey Application January 28, 1935, Serial No. 3,732

8 Claims. (Cl. 105—79)

This invention relates generally to wheel and axle assemblies of the roller bearing type and more particularly to such assemblies for the driving wheels of locomotives.

Driving wheels of locomotives are subjected to stresses which are peculiar to such structures; it is apparent that the stresses in a wheel and axle assembly comprising driving wheels are much greater than those in ordinary wheel and axle assemblies which are not required to transmit the driving power of the vehicle involved.

An object of the present invention is to provide a roller bearing wheel and axle assembly of the driving wheel type wherein the driving axle will be relatively free of the combined stresses which result from vertical loads and lateral thrusts.

Another object of this invention is to provide a roller bearing wheel and axle assembly of the driving wheel type wherein all vertical loads and lateral thrusts will be transmitted through anti-friction bearings and in which the rotating wheel and axle assembly will be free of any lateral thrusts received directly from the main frame of the locomotive.

Yet another object of the present invention is to embody in a locomotive a roller bearing wheel and axle assembly of the driving wheel type in which the driving wheels will be fixed on the ends of an inner rotating axle and the load carried on the ends of an outer non-rotating axle, said load being transmitted through said non-rotating axle and said bearings directly to said driving wheels.

The invention further comprehends a locomotive structure comprising an anti-friction roller bearing wheel and axle assembly of the driving wheel type wherein the driving wheel is provided on its inner face with a recess for receiving said anti-friction bearing and wherein a non-rotating axle is provided for receiving at one end lateral thrusts in one direction from the frame of said locomotive and at its opposite end lateral thrusts in the opposite direction. By such an arrangement it is possible to avoid any lateral thrust contact between the driving wheels and the locomotive frame such as is present in the usual locomotive structure. It is well known that wearing plates are commonly provided between the inner faces of locomotive driving wheels and the outer faces of the locomotive frames whereby lateral thrusts may be transmitted from one to the other. It is necessary frequently to lubricate these surfaces which lie in vertical planes and obviously, therefore, do not very well retain such lubrication. The design of roller bearing wheel and axle assembly comprehended in this invention eliminates such rubbing surfaces entirely.

An additional important feature comprehended in this invention is to free the axle which must bear the stresses imposed by the driving forces from other stresses which naturally result when vertical loads and lateral forces are imposed on a wheel and axle assembly. This feature is more specifically covered in the detailed description which follows.

Yet another object of this invention is the provision of a novel design of connection between the frame of a locomotive and the wheel and axle assemblies comprising the driving wheels. This novel structure is such that the lateral thrusts from the main frame in one direction are transmitted substantially through the length of the non-rotating axle and then through the anti-friction bearing and wheel at the other end of said axle, and thus to the rail; thrusts in the other direction being likewise transmitted through the opposite bearing and wheel to the other rail. By this means lateral thrusts are transmitted from the main frame through the non-rotating axle, the bearings, and the wheels without placing additional stresses on the inner axle which must carry the stresses resulting from the driving forces applied to the wheels.

Yet another object of this invention is to design a wheel and axle assembly of an anti-friction type in which a normally non-rotating axle is provided with a cylindrical loading surface to receive a special design of driving box, preferably of bronze or other metal. This special driving box may be of any material which will give preferred wearing conditions against the steel non-rotating axle. The purpose of such an arrangement is to permit the non-rotating axle to turn in the driving box in case of such a failure of the anti-friction bearing as would entirely prevent its functioning in the normal manner. It is understood, of course, that the driving box parts may be of steel if there is no desire to provide for such an emergency as that just mentioned.

A further object of the invention is to mount the inner race of an anti-friction bearing on the normally non-rotating axle of the wheel and axle assembly, said axle being so arranged that the weight imposed on it is carried on a cylindrical surface. Such a method of loading permits the normally non-rotating axle to creep and thereby to expose various positions of the bearing raceway to the loaded zone, thus distributing the wear on the roller bearing and thereby increasing its period of usefulness. By such an arrangement the roller bearing gives longer service because there is no localized weight-carrying zone and all positions of the bearing are subjected to equal wear.

Other objects and features will be more apparent from the detailed descriptions of the various structures involved.

In the drawing—

Figure 1 is a transverse sectional view of one side of a wheel and axle assembly of the driving type and its associated main frame, said view being taken substantially in the plane indicated by the line 1—1 of Figure 2;

Figure 2 is a composite view partly in section and partly in elevation of the structure shown in Figure 1, the left half of the figure being taken substantially in the plane indicated by the line A—A of Figure 1, the section being taken through the axles only and the remainder of the structure being shown in elevation with the drive wheel omitted for simplification, and the right half of the figure, also partly in section, being a view taken substantially in the plane indicated by the line 2—2 of Figure 1.

Figure 3 is a fragmentary sectional view of the structure shown in Figures 1 and 2, the section being taken in a horizontal plane as indicated by the line 3—3 of Figure 1.

It will be understood that the structure of the invention is bi-symmetrical in form and accordingly, only one half is shown.

Describing the structure more in detail, the driving wheels 2 are fixed on the outer ends of the inner rotating axle 4 and provided with the usual crank pin 6 for connection to the reciprocating parts. The usual form of driving wheel is shown in which the center 8, constituting the main portion, is provided with a tire portion 10 having the flange 12 commonly provided. The non-rotating axle 14 is sleeved around the inner axle. This non-rotating axle is provided with thrust flanges 16 adjacent each end defining load receiving areas or journal portions 18. Upon these load receiving areas is mounted the two-part axle bearing block 20. The top part or portion 22 of the axle bearing block or driving box 20 is a saddle-like structure formed to fit in the bearing area 18 and interfitting with a lower segment 24. The two parts of the axle bearing block are secured around the non-rotating axle by means of threaded bolts 26 and their associated nuts 28. This axle bearing block 20 has a flange 30 around its inner edge abutting against the thrust flange 16 of the non-rotating axle.

If desired, the parts of this bearing block may be of bronze or some similar metal. Such a metal would give reasonably good wearing conditions against the normally non-rotating steel axle if failure of the anti-friction bearing caused it to turn. Provision is thus made for rotation of the non-rotating axle in case of emergency.

The bearing block 20 receives both the vertical loads and the lateral thrusts imposed upon the wheel and axle assembly. The locomotive frame 32 is provided with the usual pedestal jaws 34, having the common arrangement of the shoe 36 and the wedge 38 by which an adjustable seat is secured between the bearing block 20 and the pedestal jaws 34 of the locomotive frame. The inner face of the said shoe abuts against the bearing block flange as at 40, and the inner face of the wedge 38 likewise abuts against the said flange as at 42.

It will be obvious that lateral thrusts from the locomotive frame 32 will be transmitted against the bearing block flange 30 and through the bearing block to the thrust flange 16, through the non-rotating axle to the anti-friction bearing at the opposite side of the wheel and axle assembly, thence through the said bearing to the driving wheel and through the flange of the said wheel to the rail. Thrusts from either side of the locomotive frame, therefore, can be transmitted in one direction only and that direction is always toward the opposite side of the wheel and axle assembly upon which the frame rests. This is necessarily the case because the locomotive frame is free to move outwardly away from the flange 30 on either side and therefore has unrestricted movement outwardly from the thrust flange 16.

By this construction I have avoided any direct thrust and prevented the possibility of lateral thrusts being transmitted directly from one side of the locomotive frame to the driving wheel on that side. The usual locomotive structure provides a friction bearing arrangement on the inner face of the driving wheel to receive lateral thrusts from the locomotive frame. Necessarily, these bearing areas have vertical faces and because of this fact it is very difficult to keep them lubricated. In the structure I have shown, I have eliminated wearing surfaces between the revolving parts and the load carrying parts except through the medium of a dual purpose anti-friction bearing.

The load of the locomotive is imposed on the wheel and axle assembly through the saddle 44, a U-shaped member having the boss 46 engaging in the associated recess 48 in the bearing block 20. The upper ends of the saddle 44 fit within the grooves 50—50 of the spring seat 52. The spring seat 52 extends from one side of the locomotive to the other and is provided at each end with a recess 54 within which is carried the center band 56 of the semi-elliptic spring 58. The ends of the semi-elliptic spring 58 are connected by hangers with the equalizing system which supports the weight of the locomotive in the usual manner.

It is clear that in this construction any weight imposed on the semi-elliptic spring 58 is transmitted through the spring seat member 52 and the saddle 44 on to the bearing block 20 which transfers the weight to the non-rotating axle 14 and through the anti-friction bearing to the driving wheel. It is clear also that the main frame itself, which is supported on the semi-elliptic spring, will be free to move up or down within the two arms of the saddle member 44 (Figure 1) with the action of the spring.

The annular flange 60 defines the bearing and lubricant receiving cavity 62 on the inner face of the driving wheel within which is received the cup or outer race 64 of the anti-friction bearing generally indicated at 66. The inner race or cone 68 of the bearing is mounted upon the end of the non-rotating axle 14 and between the two races. The anti-friction rollers 70 are held in place by the cage 72. The recess 62 is inclosed by the cover plate 74 secured to the driving wheel by means of a series of threaded bolts 76. A lubricant deflector 78 cooperates with the annular groove 80 formed on the inner face of the closure plate 74 to provide a lubricant retaining labyrinth; and, to prevent ingress of extraneous matter, the snap ring 82 may be secured in the groove 84 of the outer axle 14 and adjacent the shoulder 86 on the closure plate 74.

In this structure it will be observed that a pair of driving wheels is mounted on a rotatable axle and the weight carried by the wheel and axle assembly is suspended on a non-rotating member or axle supported by dual purpose anti-friction bearings in recesses provided on the inner faces of the driving wheels. This structure eliminates heavy localized stresses in the inner axle because by means of thrust flanges all lateral thrusts are transmitted from either side of the main frame through the non-rotating axle to the anti-friction bearing and wheel on the opposite side. Heavy localized stresses normally occur in a locomotive wheel and axle assembly of the driving type in which lateral thrust is transmitted from the frame directly to the driving wheel. This localization of stresses is eliminated in a large part by the anti-friction wheel and axle assembly I have shown.

Another advantage of this design is that the wheel and axle assembly may be assembled as a unit and installed in locomotives of the present conventional types to replace the present friction bearings without material structural changes. Such a unit would consist of driving wheels fixed on the ends of an inner rotating axle, a non-rotating axle sleeved over the inner axle and anti-friction bearings mounted upon the ends of the non-rotating axle and within cavities formed on the inner faces of the driving wheels. Such a unit may be conveniently moved about and readily mounted within existing locomotives with slight changes to the locomotive framework.

Furthermore, from the above description it is obvious that all rubbing parts have been eliminated between the locomotive frame or its wear members and the driving wheels themselves.

As intimated above, the anti-friction bearing is of the dual purpose type carrying both vertical loads and lateral thrusts. In this structure the bearing carries the lateral thrusts, which in a friction type of wheel and axle assembly are transmitted directly from the main frame to the driving wheel, and distributes these lateral thrusts over a much larger portion of the driving wheel than is possible when a wheel and axle assembly of the friction type is associated with the locomotive frame.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a locomotive a main frame having pedestal jaws, an equalizing system comprising an elliptic spring at each side of said frame, a spring seat supporting said springs, a rotating axle, wheels fixed thereon, a normally non-rotating axle having thrust receiving annular flanges defining journal portions adjacent opposite ends thereof, roller bearings mounted on the ends of said non-rotating axle in engagement with said wheels, inwardly flanged anti-frictional two-piece bearing blocks encircling said journal portions within said jaws respectively, and load carrying saddle members seated on said blocks respectively and straddling the opposite sides of said frame, said saddle members providing support at the opposite sides of said locomotive for said spring seat.

2. In a locomotive a main frame having pedestal jaws, an equalizing system comprising semi-elliptic springs at opposite sides of said frame, a spring seat member supporting said springs, a rotating wheel and axle assembly, a normally non-rotating axle having annular thrust flanges defining journal portions, roller bearings mounted on the ends of said non-rotating axle in engagement with the wheels of said assembly, inwardly flanged segmental bearing blocks encircling said journal portions within said jaws respectively, and load carrying means seated on said blocks respectively and straddling the opposite sides of said frame, said load carrying means providing support for said spring seat member above said frame at opposite sides thereof.

3. In a locomotive a main frame, an equalizing system comprising elliptic springs at opposite sides thereof, a spring seat member providing support for said springs, a rotating wheel and axle assembly, a normally non-rotating axle having annular flanges defining journal portions at opposite ends thereof, roller bearings mounted on the ends of said non-rotating axle in engagement with the wheels of said assembly, inwardly flanged segmental bearing blocks secured on said journal portions in abutment with said thrust flanges respectively, and load carrying means seated on said bearing blocks and straddling the opposite sides of said frame, said means providing support for said spring seat member at opposite sides of the locomotive above said frame.

4. In a locomotive a main frame, an equalizing system comprising elliptic springs at opposite sides of the frame, a member supporting said springs at opposite sides of the frame, a rotating wheel and axle assembly, a normally non-rotating axle having annular flanges defining journal portions adjacent opposite ends thereof, roller bearings mounted on the ends of said non-rotating axle in engagement with the wheels of said assembly, inwardly flanged segmental bearing blocks secured on said journal portions in abutment with said flanges respectively, and load carrying means seated on said blocks and straddling the opposite sides of said frame, said means extending above said frame and providing support for said member at opposite sides of said frame.

5. In a locomotive a main frame, an equalizing system comprising elliptic springs at opposite sides of said frame, a rotating wheel and axle assembly, a normally non-rotating axle having journal portions adjacent opposite ends thereof, roller bearings mounted on the ends of said non-rotating axle in engagement with the wheels of said assembly, anti-frictional segmental bearing blocks secured on said journal portions, load carrying means seated on said blocks respectively and straddling the opposite sides of said frame, and a member seated on said load carrying means and providing support for said springs outwardly of said frame.

6. In a locomotive a main frame having pedestal jaws, an equalizing system comprising elliptic springs at opposite sides of said frame, a spring seat supporting said springs, a rotating axle, wheels fixed thereon, a normally non-rotating axle, anti-friction bearings mounted on the ends of said non-rotating axle in engagement with said wheels, bearing blocks positioned on said non-rotating axle, and load carrying saddle members seated on said blocks respectively and providing support at the opposite ends of said non-rotating axle for said spring seat.

7. In a locomotive a main frame having pedestal jaws, an equalizing system comprising elliptic springs at opposite sides of said frame, a spring seat supporting said springs, an anti-friction wheel and axle assembly comprising a normally rotating inner axle, wheels fixed thereon, a normally non-rotating outer axle, roller bearings on the ends of said outer axle in engagement with said wheels, bearing blocks positioned on said outer axle adjacent the opposite ends thereof, and load carrying means seated on said bearing blocks and supporting the opposite ends of said spring seat.

8. In a locomotive a main frame, an equalizing system comprising elliptic springs at opposite sides of said frame, a roller bearing wheel and axle assembly comprising a normally rotating inner axle, wheels fixed on the ends of said axle, a normally non-rotating outer axle sleeved upon said inner axle, roller bearings on the ends of said outer axle in engagement with said wheels, segmental bearing blocks positioned on said outer axle adjacent the opposite ends thereof, saddle-like means seated on said bearing blocks, a span member supported on said means and supporting at opposite ends thereof said elliptic springs.

ALFRED H. OELKERS.